A. C. CHAKRAVARTY AND F. H. GREIL.
AUTOMATIC SHIN BONE CUTTER.
APPLICATION FILED SEPT. 13, 1918.

1,309,017.

Patented July 8, 1919.

Inventors:
Akhil C. Chakravarty
and
Frederick H. Greil
by Albert Scheibli
Attorney A. C. CHAKRAVARTY AND F. H. GREIL.
AUTOMATIC SHIN BONE CUTTER.
APPLICATION FILED SEPT. 13, 1918.

1,309,017.

Patented July 8, 1919.
3 SHEETS—SHEET 3.

Inventors:
AKHIL C. CHAKRAVARTY
and FREDERICK H. GREIL
by Albert Scheible, Attorney

UNITED STATES PATENT OFFICE.

AKHIL C. CHAKRAVARTY AND FREDERICK H. GREIL, OF CHICAGO, ILLINOIS.

AUTOMATIC SHIN-BONE CUTTER.

1,309,017.     Specification of Letters Patent.     Patented July 8, 1919.

Application filed September 13, 1918. Serial No. 253,916.

*To all whom it may concern:*

Be it known that we, AKHIL C. CHAKRAVARTY, a citizen of the British Empire, residing at and whose post-office address is 1218 East Marquette road, Chicago, Illinois, and FREDERICK H. GREIL, a citizen of the United States, residing at and whose post-office address is 6617 Drexel avenue, Chicago, Illinois, have invented certain new and useful Improvements in an Automatic Shin-Bone Cutter; and we do hereby declare the following to be a full, clear, and exact description of the invention, such as will enable others skilled in the art to which it appertains to make and use the same.

Our invention relates to sawing appliances, its general objects being to provide an appliance in which the saw is automatically reciprocated across the space into which the material is fed, to provide effective means for catching the resulting refuse, and to provide means for continuously and automatically detaching such refuse from the receptacle into which the same is drawn. More particularly, our invention aims to provide an effective appliance for cutting the shin bones of carcasses into desired lengths, for catching the particles detached by the teeth of the saw, and for preventing such particles from clogging the appliance.

In packing house practice, it has heretofore been customary to feed bones of the kind mentioned along a guide, and to saw off these bones by means of a continuously rotating saw which was moved into position manually. In this way, the reciprocation of the saw had to be accomplished by manual power, and the particles detached by the saw teeth scattered widely over the machine, the operator and the adjoining room space. Consequently, such sawing appliances not only have required considerable labor outside of the feeding of the bones to the same, but also have been slow in operation and have caused a waste of the detached particles of bone, marrow and fat, which particles form a considerable amount where a machine of this kind is in steady operation. Moreover, the spattering of these particles over the machine, the room and the operator have all been objectionable, and the necessary removal of the widely scattered particles has required additional labor.

Our invention aims to overcome these and other objections to the appliances heretofore in use, first, by providing a machine in which the continuously rotating saw is steadily and mechanically reciprocated across the path into which the bones have fed; second, by inclosing the saw almost entirely by a casing which will catch the detached refuse; and third by providing automatic means for continuously scraping the refuse from the interior of such a casing, so that this refuse will readily pass into any convenient receptacle in which it may be gathered as a valuable byproduct.

Still further objects of our invention will appear from the following specification and from the accompanying drawings, in which drawings—

Fig. 5 is a vertical section through the twin funnel portion of the inclosing casing, taken from the right of the saw in Fig. 4.

Figure 1:
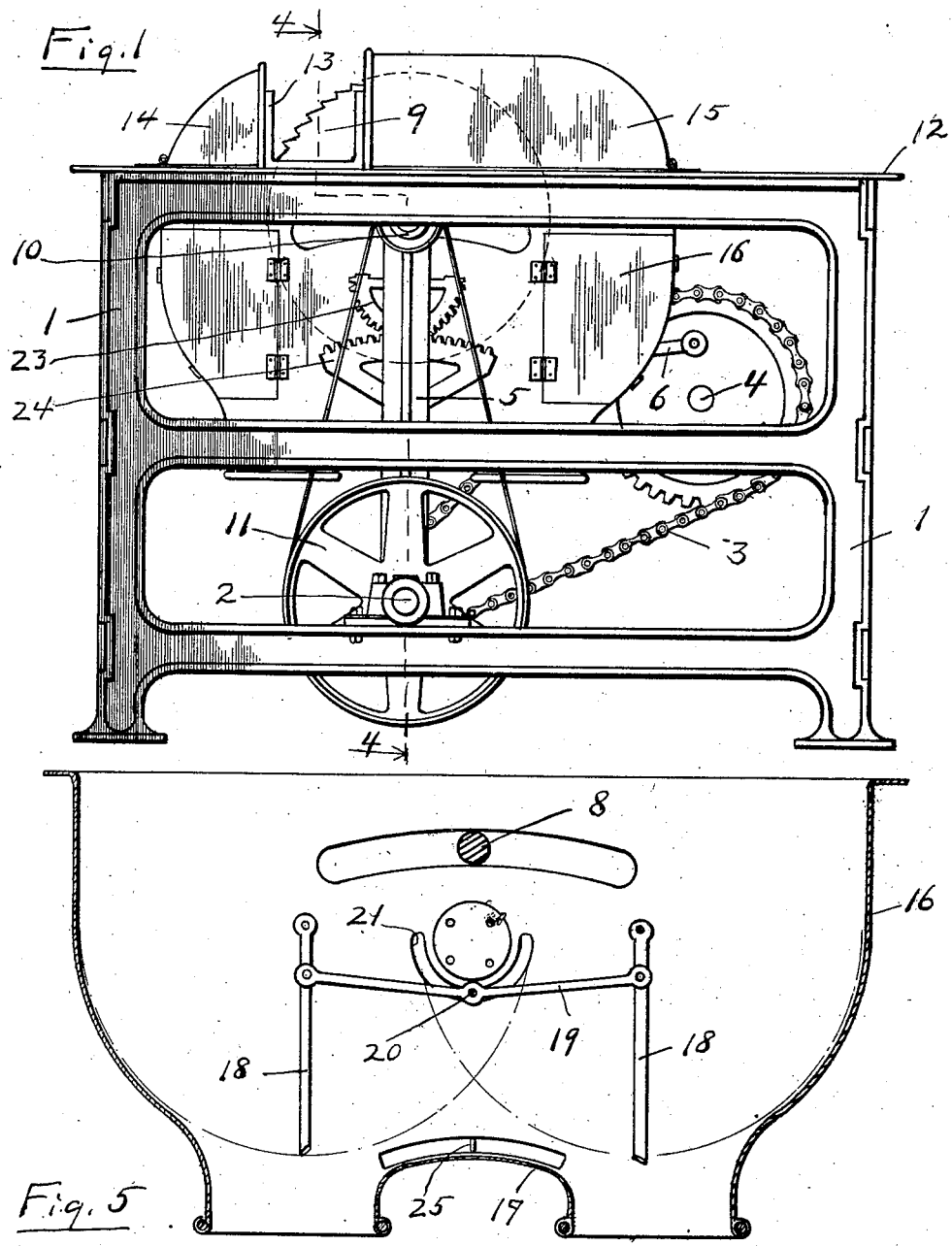
Figure 1 is a front elevation of a machine embodying our invention, with the rocker arm in its medial position.
Figure 2:
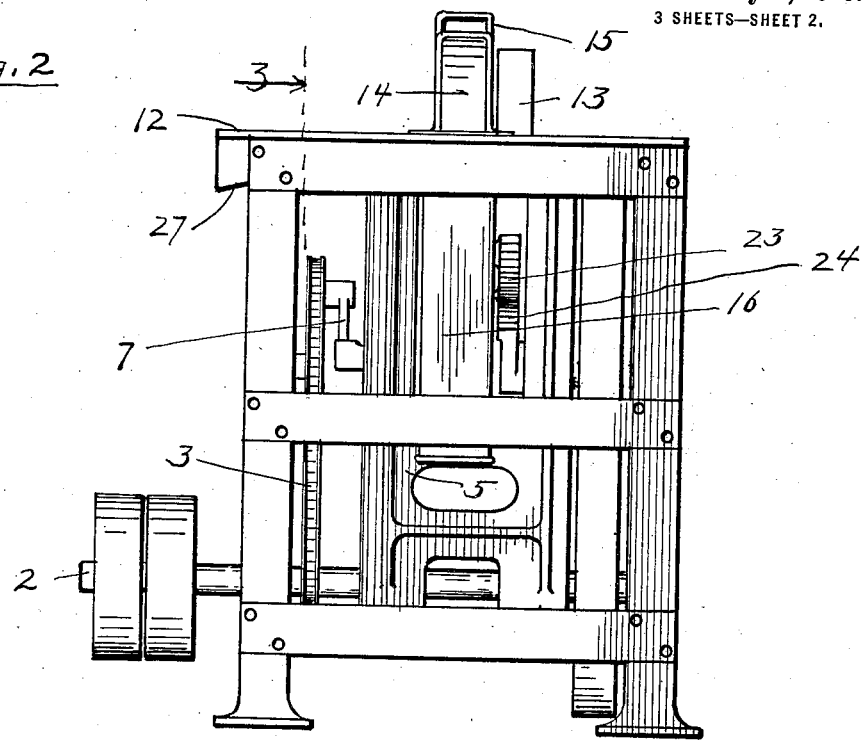
Fig. 2 is an end view of the same taken from the left hand end of Fig. 1.
Figure 4:
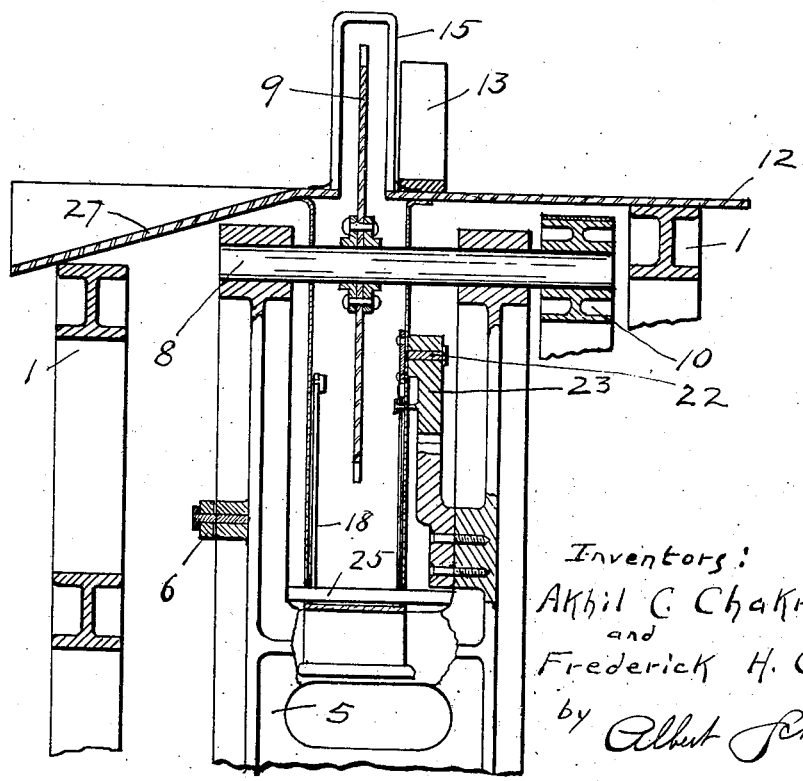
Fig. 4 is a fragmentary vertical section taken through Fig. 1 along the zigzag line 4—4.
Figure 3:
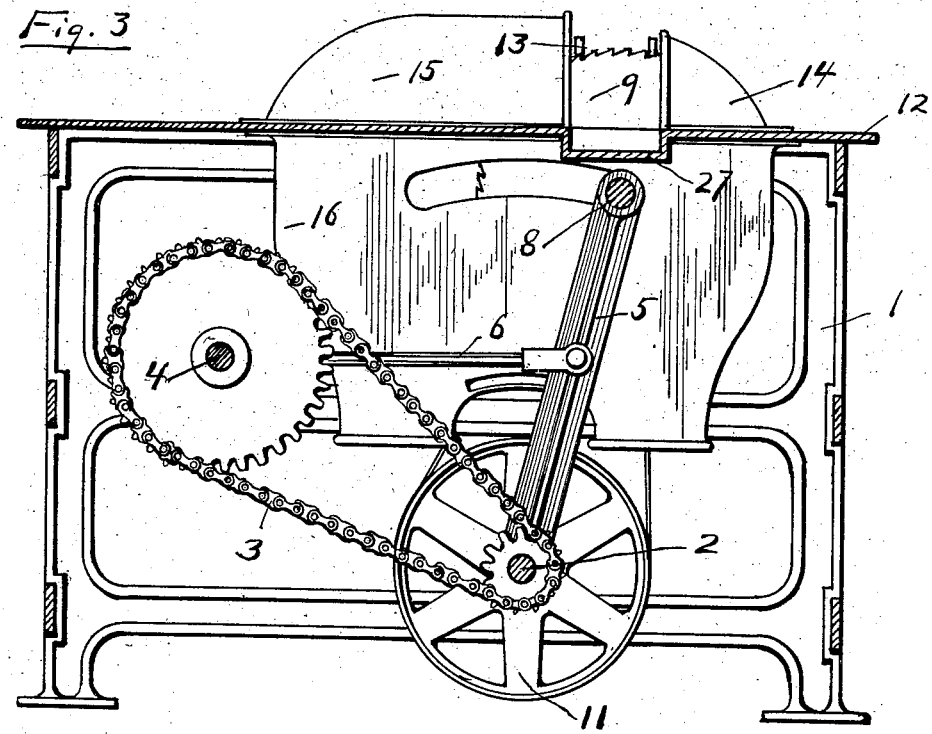
Fig. 3 is a vertical section along the line 3—3 of Fig. 2, with the rocker arm in one of its extreme positions.

In the embodiment of the drawings, the sawing appliance of our invention comprises a frame 1 supporting bearings for a power shaft 2, which shaft carries fast and loose pulleys as shown in Fig. 2 and which shaft is continuously rotated during the normal operation of the machine. The power shaft 2 is connected by a link chain 3 and suitable gearing to a secondary shaft 4 journaled in a bearing also carried by the frame 1, so that this secondary shaft also normally is continuously rotated. Pivoted upon the power shaft 2 is a rocker arm 5, which rocker arm is connected by a connecting rod 6 with a crank 7 carried by the shaft 4 and fast with respect to the latter. The rocker arm 5 is desirably substantially H shaped in form as shown in Fig. 4 and the upper ends of its two shanks afford journals for a shaft 8 carrying a circular saw 9 and a pulley 10. The pulley 10 is belted to a drive pulley 11 fast upon the power shaft 2, so that the saw 9 is continuously rotated at a considerably higher speed than the shaft 2 when the machine is in operation. The frame 1 desirably has at its top a table 12 equipped with a slot somewhat wider than the saw 9 and of such length as to allow for the free reciprocation of the saw by the action of the aforesaid crank and connecting rod on the rocker arm. Adjacent to one side of the said slot, the table 12 carries a guide 13, desirably U-shaped in section, while the other side of the table is preferably depressed so as to form a chute 27 for feeding detached bone parts into a conveniently disposed receptacle. All of the said slot with the exception of the part alining with the said guide is covered by hoods 14 and 15, which hoods form a part of a casing designed for housing the saw and catching the refuse particles detached by the latter. This casing also includes a lower portion 16, which portion desirably is in the form of a twin funnel having openings directed respectively toward opposite sides of the power shaft 2.

Figure 6:
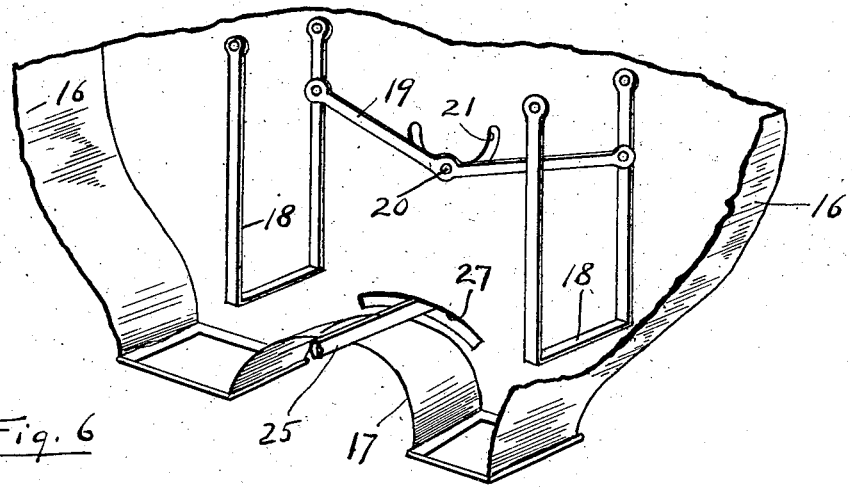
Fig. 6 is a fragmentary perspective view of the twin funnel and the scrapers operating in the latter.

To prevent the detached particles of the sawed bones from clinging to the sides of the casing portion 16 and to the ledge 17 which forms the bottom connecting the two funnel shaped outlets, we provide scrapers continuously reciprocated during the operation of the machine, which scrapers include a pair of U-shaped scrapers 18 pivoted on parallel axes extending transversely of the machine and preferably concentric with portions of the housing 16 as shown in Fig. 6. The scrapers 18 are connected by a link 19 pivoted at its center to a pin 20 which extends through an arcuate slot 21 in one side of the casing 16. This arcuate slot is concentric with a pivot pin 22 mounted on the last named side of the casing 16, and this pin 22 carries a gear segment 23 meshing with another gear segment 24. The latter segment is fastened to the rocker arm 5 and is concentric with the power shaft 2, so that the oscillation of the rocker arm will likewise oscillate the segment 23 and will therefore move the pin 20 back and forth along the arc 21. In so doing, this pin, acting through the link 19, will swing the scrapers 18 back and forth substantially as shown in dotted lines in Fig. 5, thus detaching such particles as may have affixed themselves to various side portions of the casing 16, the scraper 18 being preferably of a width approximating the interior width of the casing 16. Likewise, the rocker arm 5 directly carries a scraper 25 extending transversely of the casing 16 through slots 26 at opposite sides of the latter, which slots are close to the curved bottom portion 17 of said casing, so that the oscillation of the rocker arm automatically scrapes any deposited material off this bottom 17 and tosses such material toward the outlets of the casing 16.

The chain gear on the crank shaft 4 is desirably considerably smaller than the gear on the power shaft 2 from which the chain is driven, so as to reduce the rate of oscillation of the rocker arm, while the pulley 10 is desirably considerably smaller than the drive pulley 11, so as to increase the speed of the saw. Consequently, when the machine is in operation, the saw can easily be actuated at a high and effective velocity while the rocker arm carrying the saw is reciprocated at a sufficiently moderate rate to permit the feeding of a bone across the guide during the short interval of time while the saw is entirely clear of this guide. Moreover, since the rocker arm carrying the saw arbor 8 is continuously reciprocated by power, the operator can confine his entire attention to feeding of the bones along the guides 13, thus enabling a single operator to accomplish the sawing at a much higher rate of speed than has heretofore been customary. Likewise, since by far the greater part of the detached refuse is caught by the housing, and since this housing is continuously scraped to prevent it from being clogged, no attention need to be paid to this refuse by the operator. On the contrary, this refuse is automatically fed through the twin funnel outlets to convenient receptacles, (not shown in the drawings) so as to save the refuse as an additional source of revenue. However, while we have illustrated and described our machine as including a substantially H-shaped rocker arm and as having certain connections made through a link chain and other connections through a bolt, we do not wish to be limited to these or other details of the construction and arrangement here described, it being obvious that the same might be modified in many ways without departing from the spirit of our invention within the scope of the appended claims.

We claim as our invention:

In a sawing appliance, a support equipped for guiding the stock, a refuse-catching casing carried by the support and having an upper transverse opening through which the stock is fed, the said casing also having arcuate slots in its opposite sides; a shaft journaled on the support below the said casing and concentric with the said slots, a U-shaped rocker arm journaled concentric with the said shaft and presenting arms at opposite sides of the casing, a saw arbor carried jointly by the said arms and extending through the arcuate slots in the casing, a saw fast on the arbor and disposed within the casing, and coöperating means for rotating the arbor and for reciprocating the rocker arm about its said journaling.

Signed at Chicago September 6th, 1918.

AKHIL C. CHAKRAVARTY.
FREDERICK H. GREIL.

Copies of this patent may be obtained for five cents each, by addressing the "Commissioner of Patents, Washington, D. C."